United States Patent [19]

Frost

[11] Patent Number: 4,770,280
[45] Date of Patent: Sep. 13, 1988

[54] SNAP-ACTION ARRANGEMENT FOR TRANSFER CASE SYNCHRONIZER

[75] Inventor: Barry L. Frost, DeWitt, N.Y.

[73] Assignee: Chrysler Motors Corporation, Highland Park, Mich.

[21] Appl. No.: 58,714

[22] Filed: Jun. 5, 1987

[51] Int. Cl.$^4$ .................. F16D 23/06; B60K 23/08
[52] U.S. Cl. ..................... 192/53 F; 74/339; 74/473 R; 180/247; 192/109 A
[58] Field of Search ............ 192/53 F, 109 A; 74/339, 473 R; 180/247

[56] References Cited

U.S. PATENT DOCUMENTS

| | | | |
|---|---|---|---|
| 2,019,073 | 10/1935 | Cooper et al. | 192/53 F |
| 2,304,375 | 12/1942 | Peterson et al. | 192/53 F X |
| 2,916,939 | 12/1959 | Neracher et al. | 192/53 F X |
| 3,700,083 | 10/1972 | Ashikawa et al. | 192/53 F |
| 4,381,828 | 5/1983 | Lunn et al. | 180/247 |
| 4,529,080 | 7/1985 | Dolan | 192/109 A |
| 4,711,136 | 12/1987 | Yoshinaka et al. | 180/247 X |

OTHER PUBLICATIONS

S. A. E. Technical Paper Series No. 680008, "Manual Transmission Synchronizer", Richard J. Socin and L. Kirk Walters, pp. 31–63, (not dated).
S. A. E. Technical Paper Series No. 800002, "Internal Transfer Case Controls for Four Wheel Drive Vehicles", G. E. Huffaker, 2-25-80, pp. 1–7.

Primary Examiner—Allan D. Herrmann
Attorney, Agent, or Firm—Edward P. Barthel

[57] ABSTRACT

A spring-assisted transfer case fork assembly for shifting a synchronizer clutch sleeve from its neutral position to complete lockup of its internal splines with external splines on a transmission shaft speed-change gear. The invention uniquely arranges a dual spring biased bracket on the fork shift rail allowing subsequent lagging travel of the shifting mechanism. The shift fork assembly is affixed to a tube member with forward and aft tube portions adapted to slide on the rail for reciprocal travel between its neutral and complete lock-up positions. A first compression spring operates to constantly bias the bracket's one flange in predetermined space relation with the tube member's opposed end. A second weaker compression spring biases the bracket aft flange forwardly into abutment with the tube member's other end. The arrangement provides rapid lost motion movement instantly advancing the clutch sleeve spline teeth into initial engagement with the speed-change gear splines upon the completion of synchronization allowing the clutch sleeve internal spline teeth to pass. The shift sequence is readily completed by the smooth advancement of the clutch sleeve to its full lock-up engagement thereby obviating gear shifting interruption caused by slight delay in the initial engaging movement of the clutch sleeve.

3 Claims, 6 Drawing Sheets

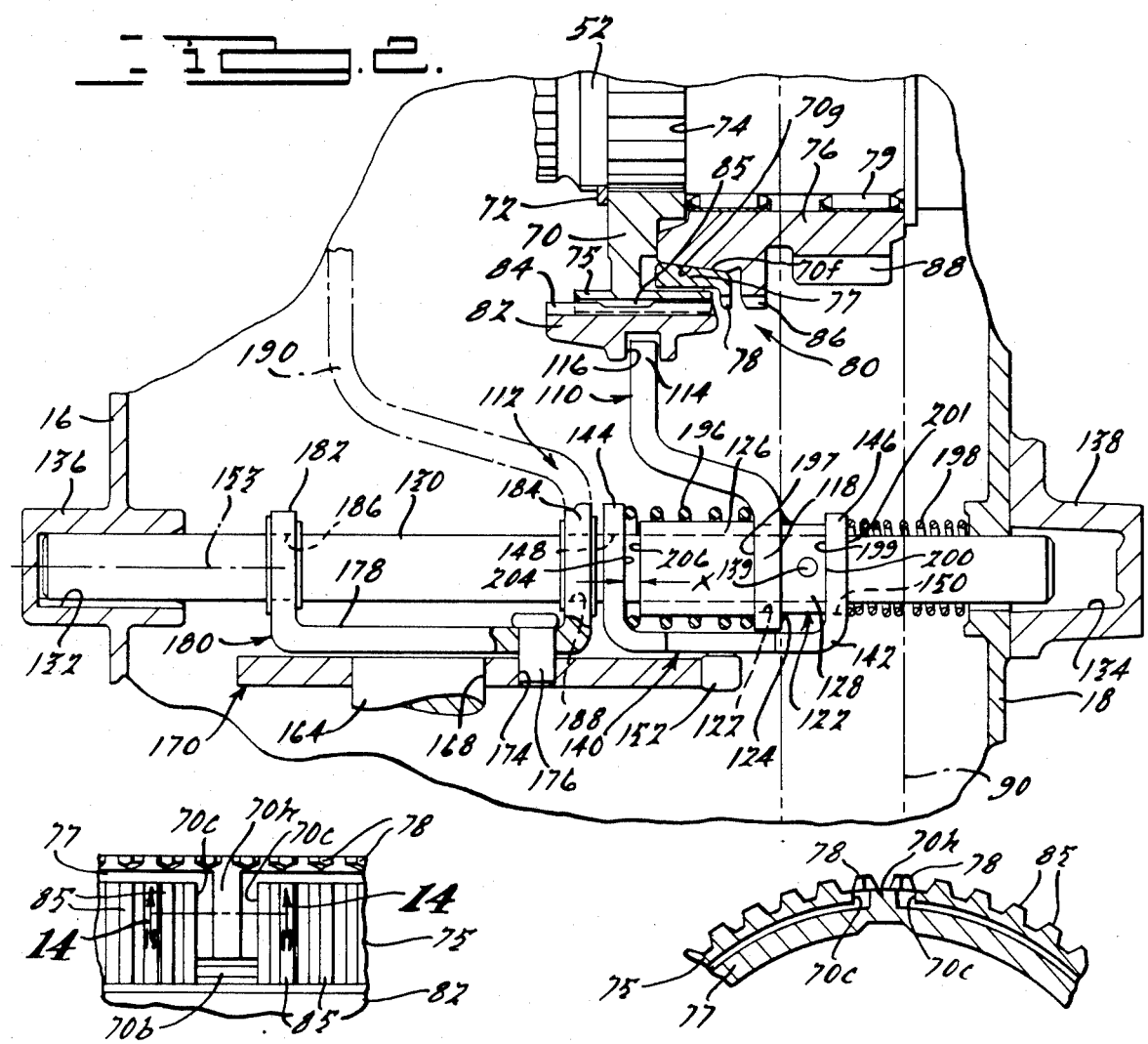
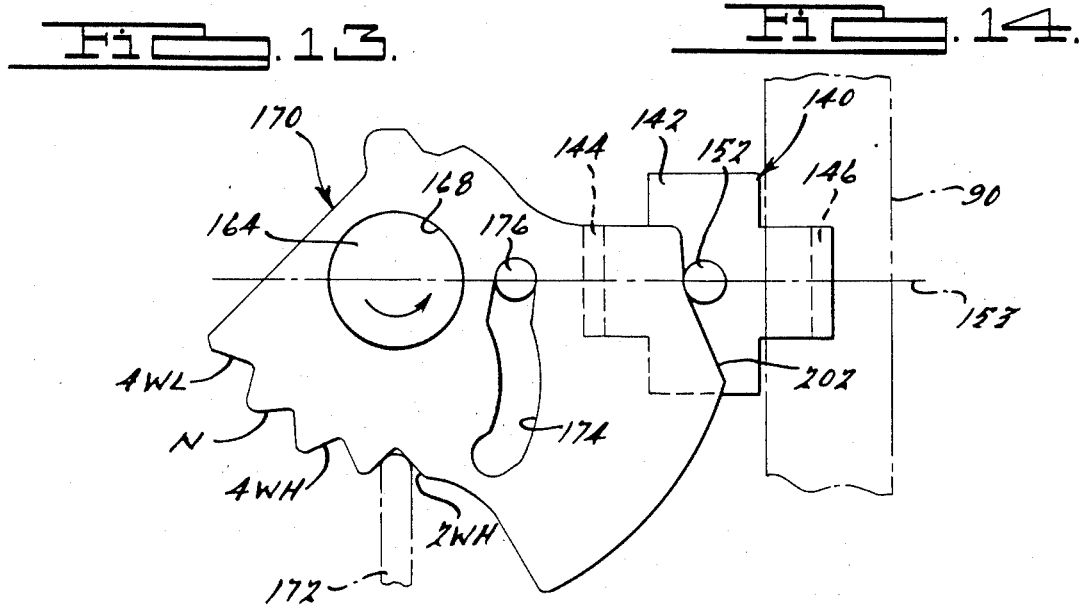
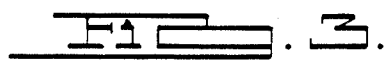

SNAP-ACTION ARRANGEMENT FOR TRANSFER CASE SYNCHRONIZER

BACKGROUND OF THE INVENTION

This invention relates to a gear synchronizer shift arrangement for motor vehicle transmissions and more particularly to such an arrangement which may be incorporated into a vehicle transfer case for a four wheel drive vehicle.

It is known to use a transmission type strut synchronizer clutch arrangement to provide on the go two-wheel to four-wheel drive mode shifting for a transfer case drive assembly. An example of one such arrangement shown and described in S.A.E. Technical Paper Series No. 800002, entitled "Internal Transfer Case Controls for Four Wheel Drive Vehicles" by G. E. Huffaker, dated Feb. 25, 1980, discloses a part-time transfer case gear synchronizer clutch. The transfer case provides a two-wheel drive operating state wherein the main shaft directly drives a tubular extension which, in turn, drives the rear axle output shaft through a gear connection in the inter-axle differential. A fork mechanism shifts a synchronizer clutch sleeve into engagement with external splines of a silent chain carrier placing the transfer case in its four-wheel drive mode delivering power via a drive chain to the vehicle front drive shaft. In such a synchronizer shifting operation there may be a slight manual or mechanical induced time delay or slippage in the shifting sequence resulting in lagging travel of the shift fork apparatus. In the event of such slippage the synchronizer sleeve internal splines are unable to advance smoothly to initially engage the chain carrier splines without some undesirable shifting resistance and/or gear noise.

SUMMARY OF THE INVENTION

It is therefore an object of the present invention to provide an improved gear synchronizer clutch mechanism which will produce an accelerated shift sequence for a given shift time interval.

It is further an object of this invention to provide an improved gear ratio synchronizing mechanism wherein the lagging travel of a shift rail fork resulting from the rotation of a transfer case cam plate, having a cam track against which a cam follower bears, is compensated by means of a spring-assisted shift fork apparatus.

Motion from a shift selector is suitably transmitted from a cam plate directly to a pin on an outer bracket of a shift fork apparatus slidable mounted on a shift rail. The shift fork apparatus, which in turn operates a gear clutch synchronizer, is adapted to slide on the rail for reciprocal travel between a two-wheel drive position and a four-wheel drive position. The cam plate may be rotated either manually by means of a shift lever or automatically by suitable power means such as, for example, a vehicle remote switch controlled electric drive motor.

A fork arm has an axially extending tube member defining forward and aft tube portions. A U-shaped bracket is slidably mounted on a shift rail by means of aligned apertures in its forward and aft side flanges. A first coil compression spring is concentrically disposed about the forward tube portion intermediate the bracket's forward flange and the shift fork arm. The first spring operates to constantly bias the shift fork tube member rearward into spaced relation with the bracket forward flange. A second coil compression spring is concentrically disposed about the shift rail intermediate the bracket aft flange and the transfer case housing. The second spring operates to constantly bias the bracket aft flange forwardly into abutment with the fork aft tube portion. The dual spring biasing arrangement thus provides rapid lost motion movement instantly advancing the synchronizer clutch sleeve into its initial locked condition from the synchronizer indexed position upon the blocker ring being unloaded. Thus, the shift sequence is smoothly completed by allowing passage of the synchronizer sleeve spline tooth to full lock-up engagement with the chain carrier spline teeth.

BRIEF DESCRIPTION OF THE DRAWINGS

The objects, features and advantages of the present invention are readily apparent from the following detailed description of the best mode taken in connection with the accompanying drawings in which:

FIG. 2 is a fragmentary and an elevational view of the fork assembly in its two-wheel drive mode;

FIG. 3 is a fragmentary top elevational view of a portion of FIG. 2;

FIG. 13 is a fragmentry elevational detail view of a poriton of the blocker ring and hub member shown in the neutral position; and FIG. 14 is a fragmentary cross-sectional view taken on line 14—14 of FIG. 13.

DESCRIPTION OF THE PREFERRED EMBODIMENT

Figure 1:
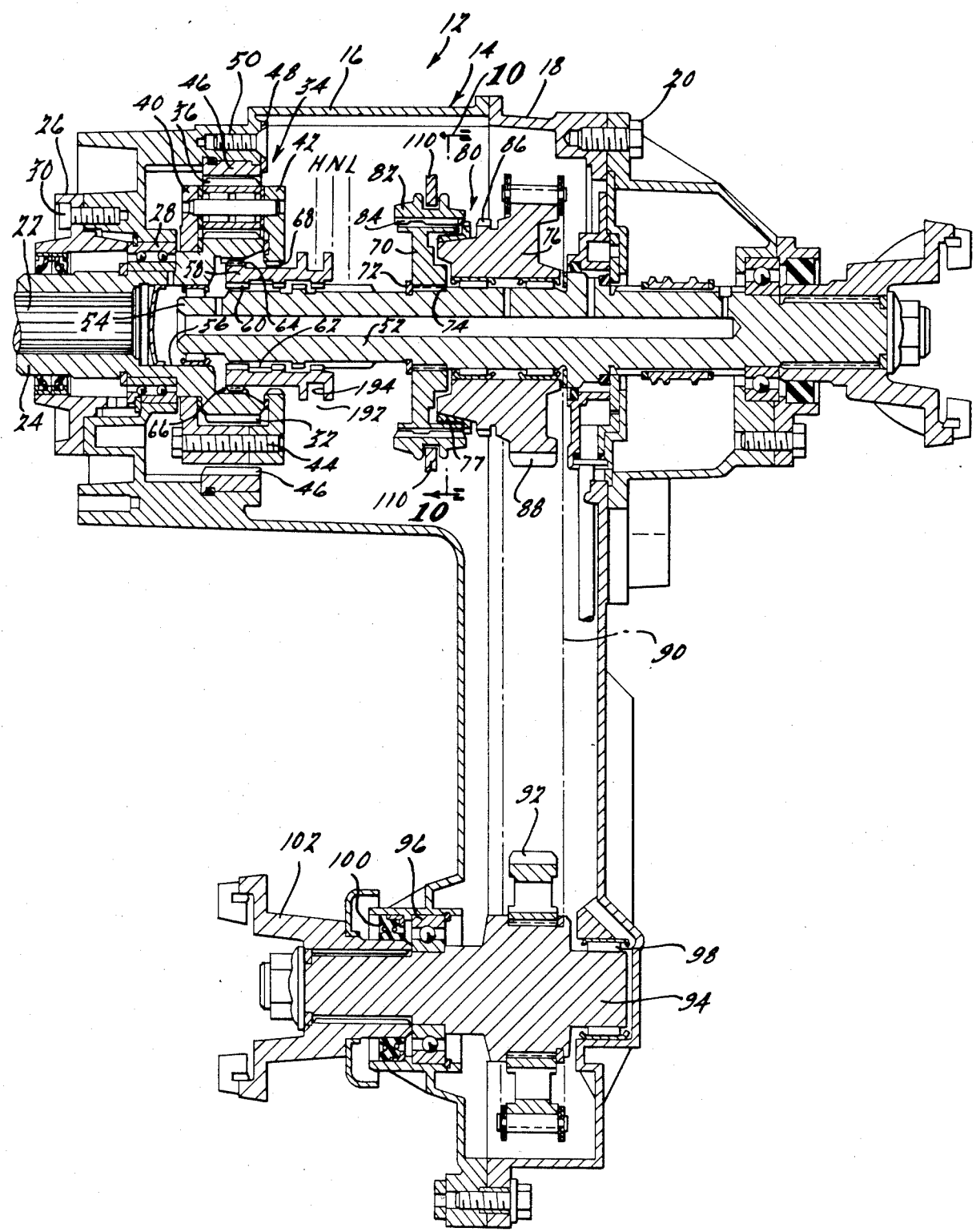
FIG. 1 is a vertical sectional view of a transfer case operation for use with the present invention.

Referring now to the drawings, there is shown in FIG. 1 a transfer case 12 including a housing 14 formed by front and back half sections 16 and 18, respectively, suitably interconnected by a plurality of threaded bolts 20. The front half section 16 receives a transmission output shaft 22 within an internally splined input stub shaft 24. The input stub shaft 24 is shown rotatably mounted in a collar portion 26 of the front half section 16 by bearing assembly 28 with the collar portion 26 secured by bolts 30 to the housing front half section 16.

The input stub shaft 24 has an input sun gear 32 of a helical planetary gear set assembly 34, formed integral therewith. The sun gear 32 is shown meshed with a plurality of planet pinion gears 36. Each planet pinion gear 36 is rotatably journalled on a pin 38 supported in a planetary carrier. The planetary carrier includes fore and aft ring members 40 and 42, respectively, secured by bolts 44. The planet gears 36 mesh with a helical annulus gear 46 mounted via a splined press-fit to the inner surface of the housing front section 16. The annulus gear 46 is additionally retained against rearward axial movement away from its stop shoulder by a plurality of radially disposed locking tabs 48 each fixed to the front section 16 by machine screws 50.

An output shaft 52 is aligned on the longitudinal axis of the input shaft 24 and has a pilot portion 54 journalled in input shaft axial bore 56. The output shaft 52 has a clutch collar 58 axially slidable thereon by means of collar internal splines 60 engaged with external splines 62 formed on the output shaft 54. The collar 50 is formed with external clutch teeth 64 shown slidably engaged with internal clutch teeth 66 located in an axial counterbore in the right or aft end of the input shaft 24. Torque or power flow is transferred directly from the input shaft 24 through the engaged teeth 64 and 66 and the engaged collar splines 60 and the output shaft splines 62 thereby establishing a direct high range position indicated by the construction line "H".

The carrier aft ring 42 includes internal spur gear teeth 68 formed concentric with the collar 58. The aft ring internal teeth 68 are placed in sliding meshed engagement with the clutch collar external teeth 64 upon the collar 54 being slid aft defining a direct low drive range indicated by the construction-line "L" position of the collar 58. It will be noted that when the collar 58 is moved a predetermined distance to the right from its high range position its external teeth 64 are disengaged from internal clutch teeth 66 for engagement with carrier aft ring internal teeth 68 providing a neutral drive range position indicated by construction line "N". With the transfer case in neutral, the planetary gear set 34 is free of engagement with any stationary transfer case gears. Therefore, the rotation of the input stud shaft 24, which includes integral sun gear 32, drives only the planetary pinion gears 36 and carrier fore 40 and aft 42 rings around the annulus gear 46. Thus, in the neutral position no driving force is transmitted to the rear output shaft 54, and thus no power to the vehicle rear wheels.

As best seen in FIG. 2, a hub member 70 is fixedly splined to the output shaft 54 by snap ring 72 and stop shoulder 74 formed on the output shaft. The hub member 70 which includes an outer hub portion 75, is selectively coupled to a chain carrier 76. The hub portion 75 encircles a blocker ring 77 having radially extending external tooth 78 formed at its aft end. The hub member 70 is rotatably journalled by roller bearings 79 on the output shaft 54 by a synchronizer mechanism generally indicated at 80.

The synchronizer mechanism 80 depicted in the present embodiment is a conventional strut-type blocking synchronizer which is shown and described in detail in the S.A.E. Technical Paper Series No. 680008 entitled "Manual Transmission Synchronizer" by Richard J. Socin and L. Kirk Walters. It is to be understood, however, that other types of synchronizer mechanisms could be used without departing from the scope of the present invention. An example of another synchronizer mechanism which could be used with the present invention is disclosed in U.S. Pat. No. 3,700,083 issued Oct. 29, 1972 to N. Ashikawa et al. commonly referred to as a "strutless" synchronizer. Further, the chain carrier 76 could be in the form of other gear means, such as a speed gear member journally mounted in a transmission speed shaft for example, without departing from the scope of the present invention.

Figure 8:
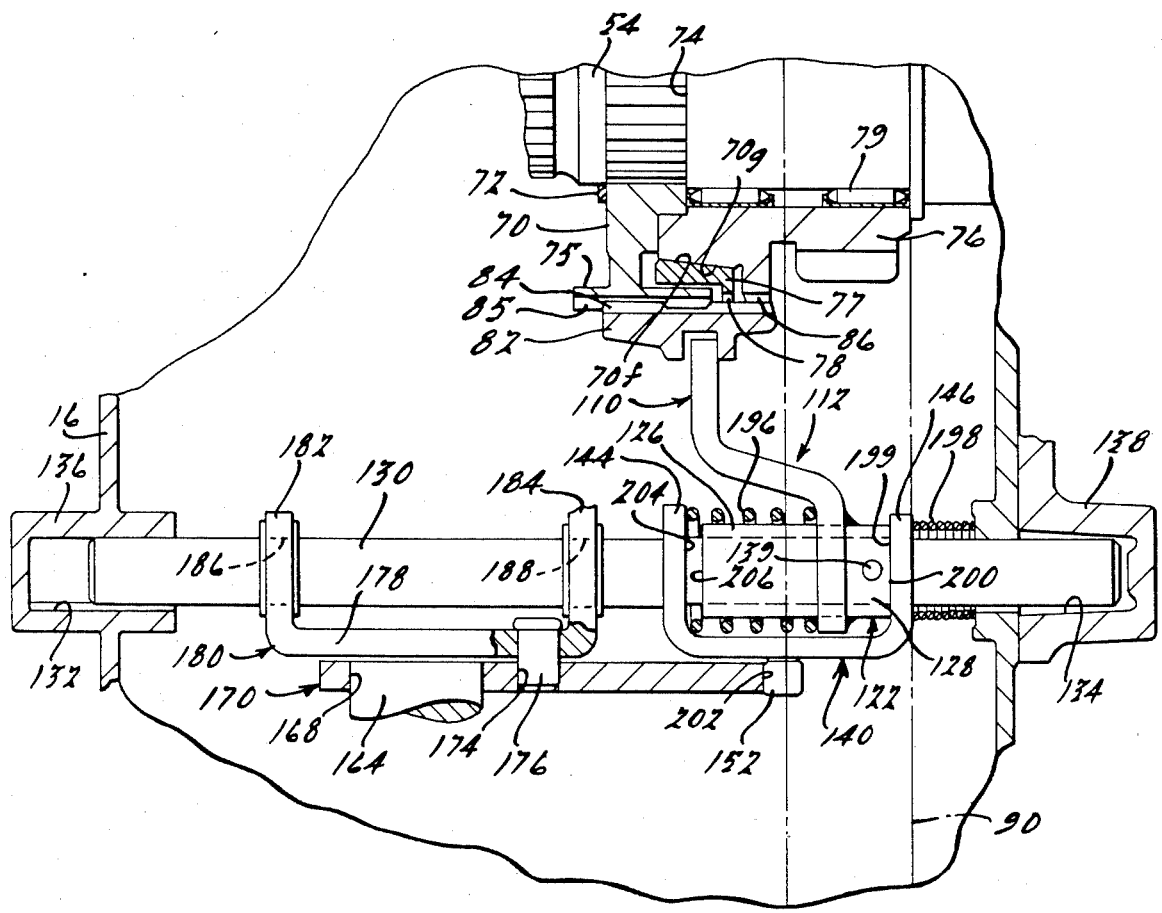
FIG. 8 is a view similar to FIG. 6 showing the fork synchronizer in its fully engaged or lock-up position.
Figure 9:
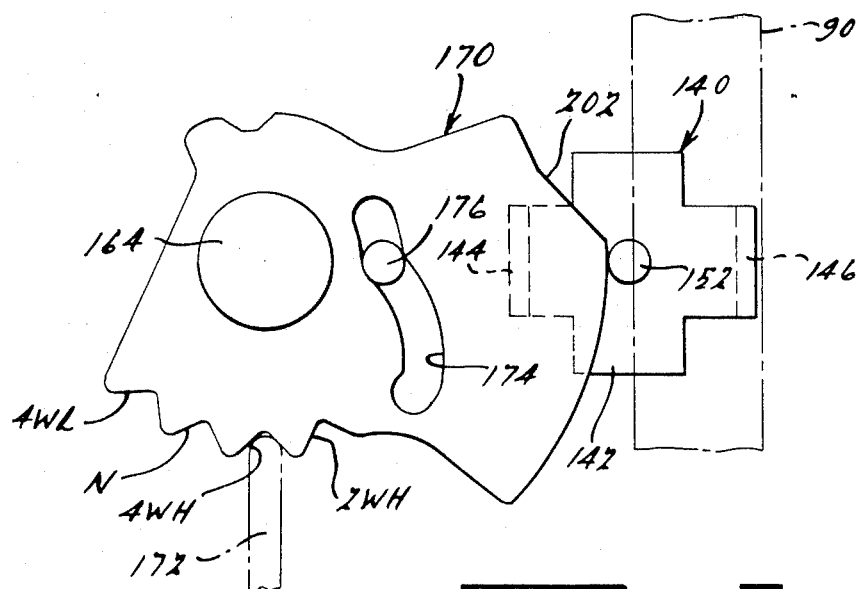
FIG. 9 is a view similar to FIG. 7 showing the final position of the cam member.

Shiftable clutch sleeve 82 of the synchronizer mechanism is shown in its FIG. 1 central disengaged or neutral position. The clutch sleeve is formed with internal spline teeth 84 which are in constant axial sliding engagement with an external spline teeth 85 formed on the hub portion 75. Thus, the synchronizer clutch sleeve 82 may be shifted to the right or aft to its four-wheel drive complete lockup position shown in FIG. 8 wherein its internal spline teeth 84 drivingly engage external spline teeth 86 of the chain carrier 76.

Figure 10:
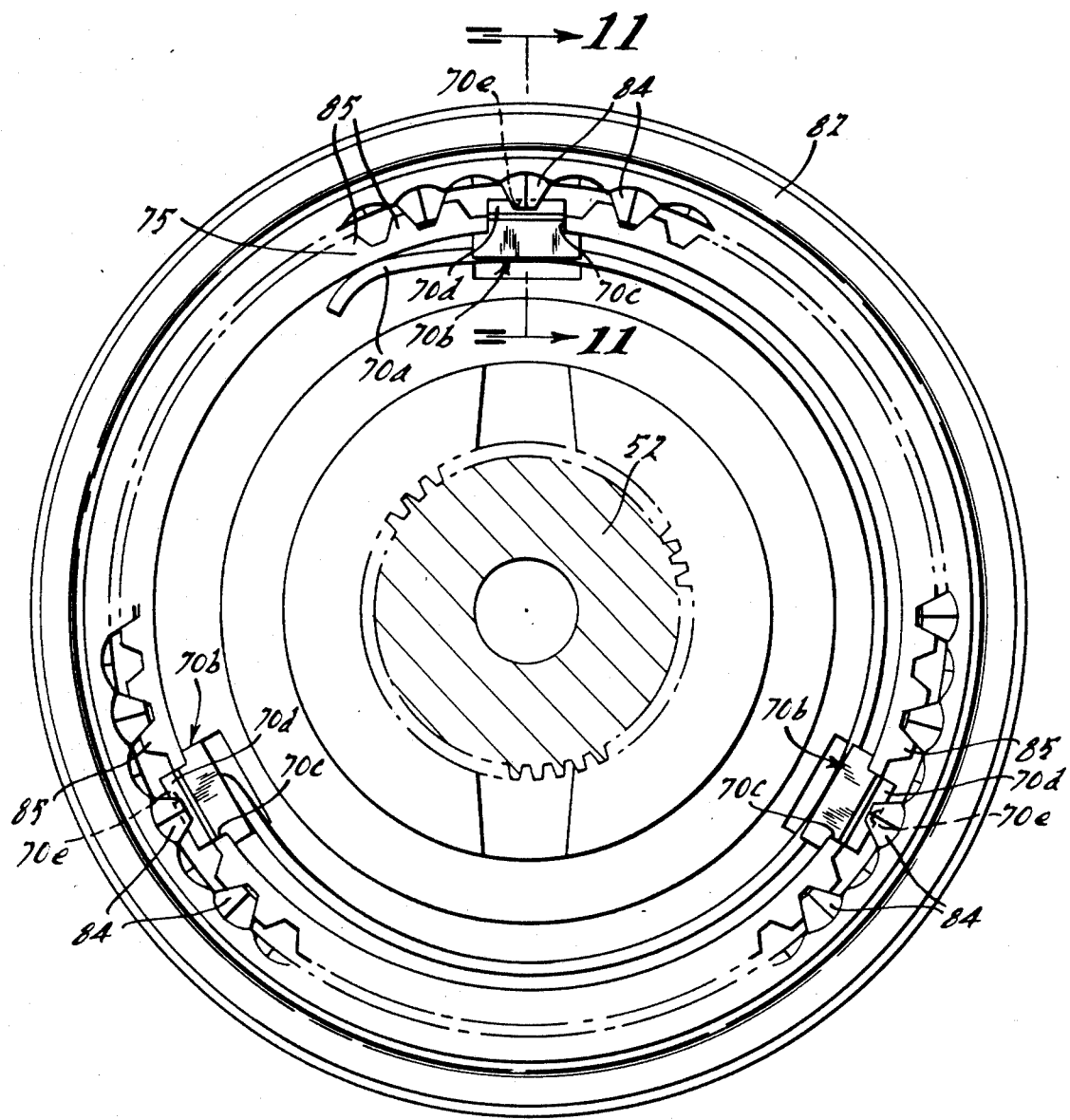
FIG. 10 is a cross-sectional detail view of the synchronizer mechanism sleeve and hub members taken substantially on line 10—10 of FIG. 1.
Figures 11, 12:
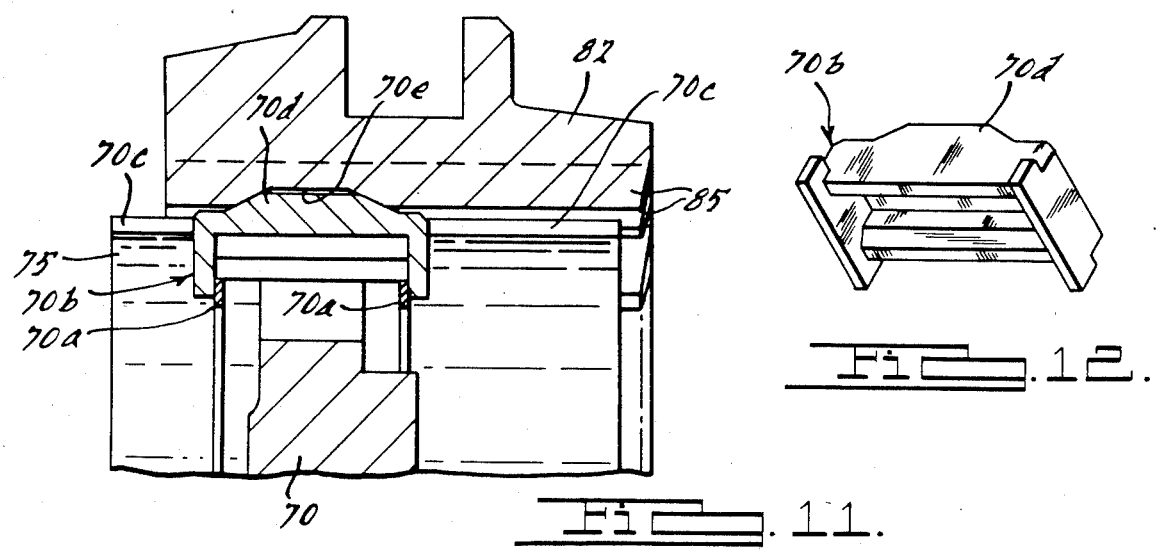
FIG. 11 is a fragmentary sectional view taken on line 11—11 of FIG. 10.
FIG. 12 is an enlarged perspective view of one of the key-like struts shown in FIGS. 10-12.

FIGS. 10–12 show a thrust mechanism for moving the blocker ring 77 toward the chain carrier 76 upon shifting the clutch sleeve 82 to the right. In the strut type blocking synchronizer 80 the thrust mechanism comprise a pair of energizing circular retainer springs 70a that are compressed and inserted between a plurality of circumferentially spaced key—like struts, generally indicated at 70b. Each of the three struts are biased outwardly in their respective longitudinally extending slots 70c formed in the hub portion 75. The three struts of the disclosed embodiment each have a raised central "bump" portion 70d which engage a corresponding detent groove or recess 70e formed in its associated sleeve external spline teeth 85 with the clutch sleeve 82 in its neutral FIG. 2 position. It will be noted that rightward movement of the synchronizer blocker ring 77 results in frictional loading between blocker ring inner conical surface 70f and chain carrier outer conical surface 70g by outward thrusting of the struts 70b.

As seen in FIG. 1 the chain carrier 76 includes a drive sprocket 88 drivingly engaging a chain, shown in dashed lines at 90, which is coupled to a lower driven sprocket 92. The driven sprocket 92 in turn is coupled to a front output shaft 94. Shaft 94 is mounted for rotation within the housing front half 16 by ball bearing assembly 96 and the housing rear half 18 by roller bearing assembly 98. Also an oil seal assembly 150 seals the shaft 94 in the housing. The transfer case front output shaft 94 is suitably connected by coupling 102 to the vehicle front propeller driven shaft (not shown). Reference may be had to U.S. Pat. No. 4,381,828 issued May 3, 1983, to Lunn et al. for details of a typical transfer case mounting showing its connection to a vehicle front and rear drive axles. The disclosure of the Lunn et al. patent is incorporated by reference herein.

With reference to FIGS. 1 and 2 it will be seen that a mode fork 110 of a shift fork assembly 112 has opposite sleeve engaging forked projections 114 engaged in annular groove 116 formed in the sleeve 82. As viewed in FIG. 2 the mode fork 110 includes L-shaped offset arm 118 with an aperture 120 formed therein. A longitudinally disposed cylindrical hollow tube member 122 extends through the aperture 120 and is suitably fixed to the arm 118 as by welds 124. The tube member 122 defines forward 126 and aft 128 tube portions, respectively, with the forward tube portion 126 having a predetermined length of about two and one-half times the length of the aft tube portion 128.

A shift rail 130 is received within the sleeve member 122 and its opposite ends are suitably supported in the transfer case housing fore and aft sockets 132 and 134, respectively. The socket 132 is formed in boss 136 integral with the front housing 16 while socket 134 is formed in boss 138 integral with the aft housing 18. The tube member 122 is fixed to the shift rail by a cross or through pin 139.

An aft U-shaped mode bracket, generally indicated at 140, is shown in FIG. 2 having a base portion 142 and a pair of forward and aft flanges 144 and 146, respectively, extending normal to the base portion 142 toward the output shaft 54. The forward flange 144 has an aperture 148 therein of a determined diameter sized for slidably receiving the forward end of rail 130 therethrough. The mode bracket aft flange 146 has an aperture 150 sized for the slidable reception of the aft end of the rail 130.

With reference to FIG. 3 it will be seen that the U-shaped bracket base portion 142 has a cam follower pin 152 extending outwardly therefrom with its principal axis intersecting the longitudinal axis 153 of rail 130 at a right angle. An actuating shaft 164 is supported in the interior of the transfer case housing 12 for rotation about its axis 165. As seen in FIGS. 2 and 3, the actuating shaft 164 inner end is secured in hole 168 formed in shift sector or cam plate 170. A suitable shift lever and connecting linkage or the like (not shown) is provided to allow rotation of the actuating shaft 164 and cam plate 170 about its principal axis 165 under the control of the vehicle operator. It will be understood that the actuating shaft 164 could be rotated mechanically, such as by an electric drive motor as well as manually, without departing from the scope of the present invention.

With reference to FIGS. 2 and 3 it will be seen that the cam plate 170 may be rotated by the actuator shaft 164 to any of four selected positions indicated by the four sector notches labeled "2WH", "4WH", "N" and "4WL" each successively engageable by a spring biased plunger indicated schematically in phantom at 172. It will be noted that the cam plate 170 has a slot 174 formed therein into which a range pin 176 extends.

FIG. 2 shows the range pin 176 mounted in base portion 178 of a forward U-shaped range bracket 180. The range bracket 180 includes a pair of ore and aft flanges 182 and 184, respectively, extending normal to their base portion 178 toward the output shaft 52. The forward flange 182 has an aperture 186 therein sized for slidably receiving the forward end of rail 130. The range bracket aft flange 184 is provided with an aperture 188 sized for the reception of the rail aft end 130. The aft flange 184 has formed integral therewith a range fork assembly 190 with opposite forked projections 192 engaged in annular groove 194 (FIG. 1) of collar 58.

With reference to FIG. 2 it will be seen that a first compression helical spring 196 encircles the forward tube portion 126 with its ends in flush axial contact between the inner face of forward flange 144 and the opposed face 197 of the mode fork arm portion 118. The first spring 196 thus biases the bracket 140 forward or leftward urging the cam follower pin 152 into contact with the cam plate with the synchronizer clutch 80 in its neutral FIG. 2 position. As a result inner face 199 of bracket aft flange 146 is biased into flush contact with opposed end face 200 of aft tube portion 128. A second compression helical spring 198 encircles the aft end portion of the shift rail 130 intermediate the rearward flange 146 and the interior surface of the housing back half section 18. The second spring 198 exerts a predetermined compressive force less than the compressive force of the first compression spring 196. It will be noted that in the FIG. 2 neutral position a predetermined axial clearance space "X" is provided for reasons to be explained.

In operation upon the vehicle operator desiring to shift the transfer case 12 from the two wheel drive high range (2WH) to the four wheel drive high range (4WH), the shift lever is moved rotating the shaft 164 and cam plate 170 counterclockwise through a predetermined angle. The cam plate 170 is rotated from its position in FIGS. 2 and 3 to the position shown in FIGS. 4 and 5. When the shift is initiated cam follower pin 152 rides on the sector plate linear cam edge 202 to an intermediate FIG. 5 position. As a result, the bracket 140 travels a predetermined axial distance rightward until its forward flange inner face 204 contacts opposed end face 206 of the forward tube portion 126. This predetermined righthand bracket travel further compresses or loads both the first 196 and the second 198 springs an provides a predetermined axial clearance indicated at "Y" in FIG. 4.

The shift sequence of the synchronizer 80 is initiated upon the clutch sleeve 82 being moved from its neutral position shown in FIG. 2 to a first strut detent position. In this first position a force, either manual or mechanical, is applied starting movement of the clutch sleeve 82 to the right. This force causes the clutch sleeve 82 and struts 70b to move axially out of the neutral FIG. 2 position taking up the running clearances between the clutch sleeve 82 with the blocker ring 77, and between the blocker ring 77 with the chain carrier external teeth 86.

A second strut detent load build-up step occurs next wherein the struts 70b, blocker ring 77, and chain gear 76 are loaded by the struts 70b riding out of the detent grooves 70e.

A third step occurs in the sequence when the blocker ring 77 moves to its indexed position. This occurs because an axial come torque force is also being applied to the blocker ring 77 by the struts 70b. This frictional cone torque loading is developed by the frictional loading between blocker ring inner conical surface 70f and chain carrier outer conical surface 70g. The blocker ring has three equally spaced indexing lugs 70h centered in their associated hub slot 70c as shown in FIGS. 13 and 14. The cone torque loading causes the synchronizer clutch blocker ring 77 to rotate in one direction to its indexed position. In the indexed position the blocker ring has each of its outer lugs 70h rotated in one direction wherein the blocker ring lugs 70h contact one side of their associated hub slot 70c.

Figures 4, 5:
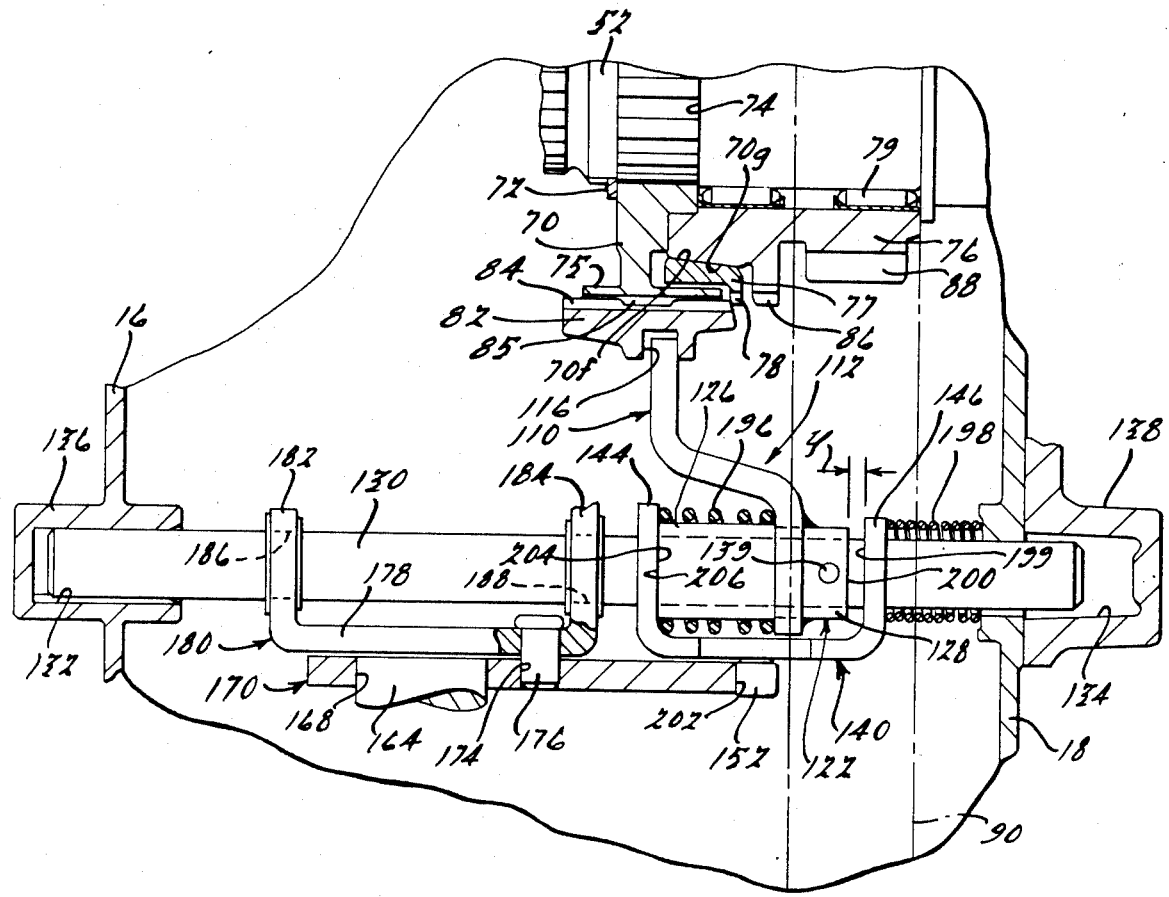
FIG. 4 is a view similar to FIG. 2 showing the fork assembly partially advanced such that the synchronizer sleeve is moved axially out of the neutral position closing its running clearances.
FIG. 5 is a view similar to FIG. 3 showing the cam member partially rotated.

As a fourth step the cone clutch is engaged by the clutch sleeve 82 internal spline teeth 84 chamfers contacting the blocker ring external teeth 78 chamfers as shown in FIG. 4.

A step five consists of the blocking ring 77 rotating or moving aside in the opposite direction allowing the clutch sleeve intermal spline teeth 84 to pass. This opposite rotation of the blocker ring is achieved when the chain carrier 76 rotational speed causes the cone torque to fall to zero. Synchronization is now complete and the blocker ring 77 is no longer energized. As the index torque resulting from the chamfer-to-chamfer loading between the sleeve internal splines 84 and the blocker ring teeth 78 now exceeds the cone torque the blocker ring 77 is free to rotate in the opposite direction. This opposite rotation causes the blocker ring lugs 70h to move from their indexed position, contacting one side of their associated slot 70c, to a position shown in FIGS.

13 and 14 wherein each lug 70h is centered on its slot 70c.

Figure 6:
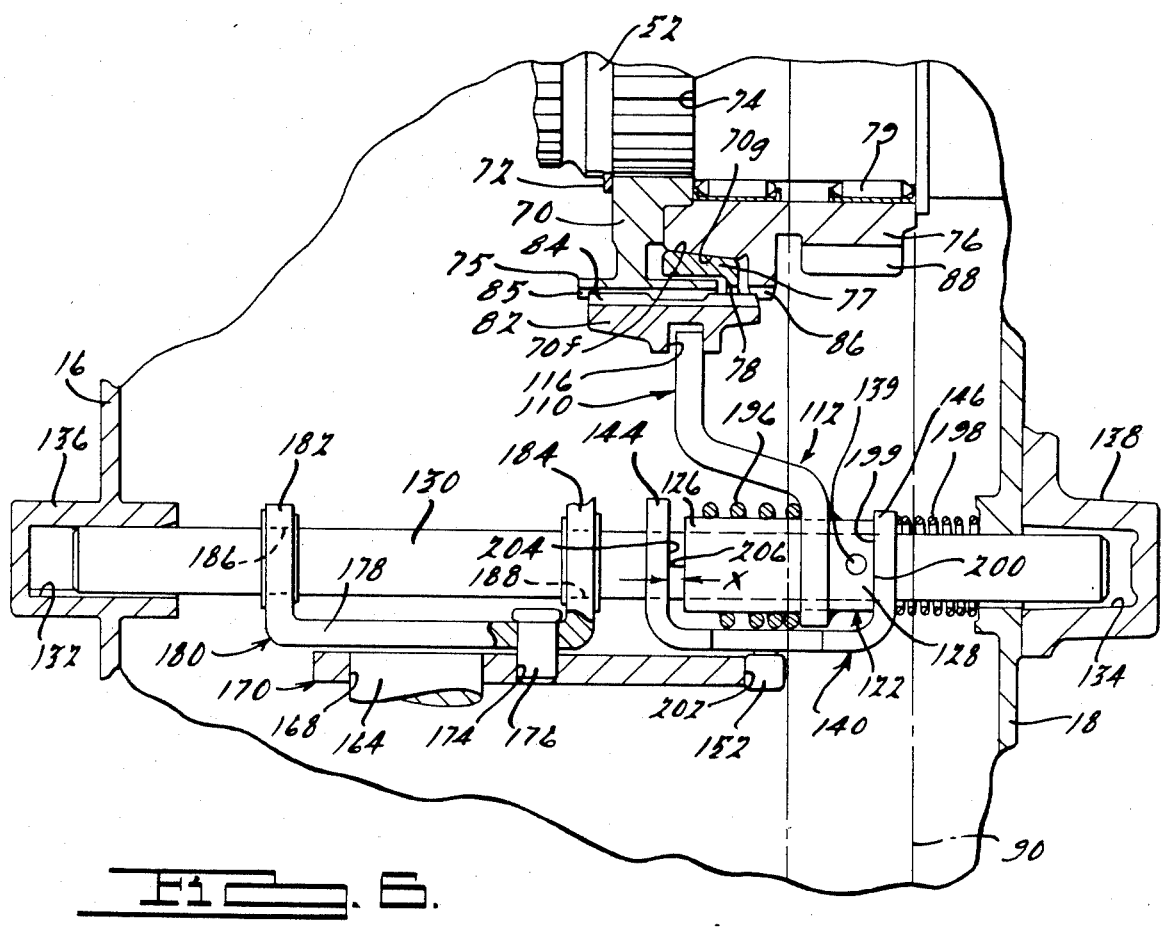
FIG. 6 is a view similar to FIG. 4 wherein the spring fork assembly is partially advanced such that the synchronizer sleeve teeth contact the blocker ring teeth.
Figure 7:
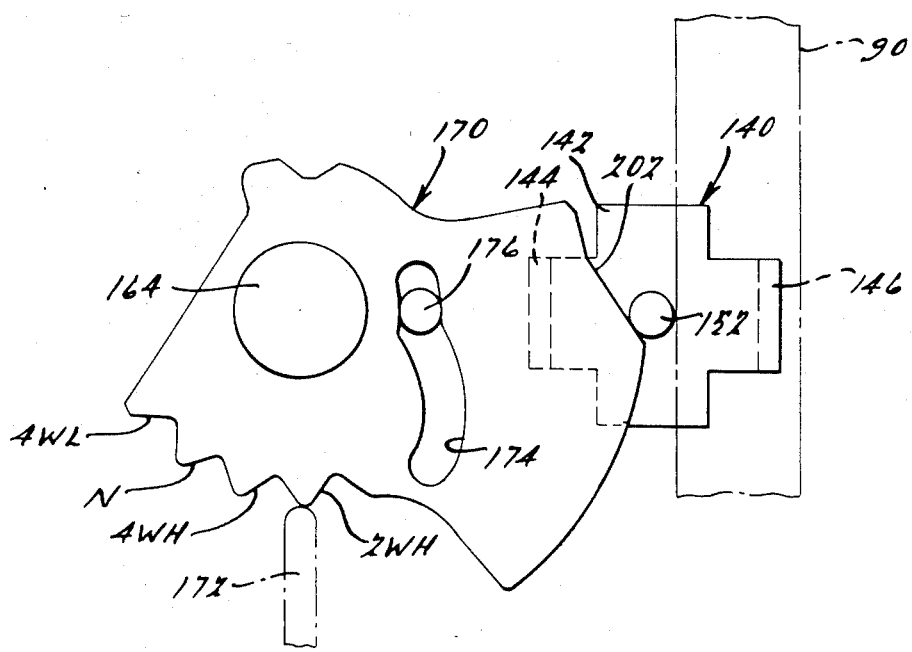
FIG. 7 is a view similar to FIG. 5 showing the cam member further rotated.

A sixth step occurs when synchronization is complete wherein the chain carrier 76 rotates aside to pass the sleeve internal splines teeth 84 beyond the blocker ring teeth 78 a predetermined distance wherein initial locked contact is made between the spline teeth 84 and the chain carrier externalspline teeth 86 as seen in FIG. 6. An index torque is now built on the gear chamfers which moves the chain carrier aside and the sleeve passes through, completing the lock-up.

It will be noted that once synchronization has been achieved in the indexed position the blocker ring 77 is unblocked and moves aside to pass the sleeve spline teeth 84 into initial locked contact. Thus, it is critical that the clutch sleeve 82 be quickly advanced rightward to its FIG. 6 locked position wherein sleeve spline teeth 84 engage the chain carrier external spline teeth 86. It has been demonstrated in driving tests that a momentary delay in the advancement of the clutch sleeve 82 between steps five and six allows the chain carrier to resume rotational movement. Any resumption of rotational movement by the chain carrier 76 tends to interfere or interrupt the travel of the sleeve 82 by not allowing the sleeve spline teeth chambers to smoothly contact the chain carrier gear teeth 86 opposed chamfers. Such smooth chamfer-to-chamfer contact allows the clutch sleeve to rotate the chain carrier aside and enable the sleeve internal spline teeth 84 to pass through into locked contact with the chain carrier gear teeth 86. Said another way interruption or noise in the shifting sequence is caused by the chain carrier spline teeth 86 rotating away from their aligned positions prior to the sleeve spline teeth passing therebetween to their initial locked mode position of FIG. 6.

Upon the sleeve internal spline teeth 84 being clocked or indexed into axial alignment with exterior teeth 86 the loaded first spring 196 unloads and allows initial shifting to the locked position of FIG. 6. That is, the first spring 196 instantaneously advances the fork 110 and its tube member 122 through the clearance space "Y" such that aft face 200 abuts the bracket aft flange face 199. The "X" clearance space is now re-established. Thus, the snap-action of spring 196 provides initial locking-travel of the synchronizer sleeve 82 thereby compensating for any momentary shift delay. It will be appreciated that such delay could occur in either a manual o powered shifting apparatus. The shift sequence is completed by advancing sleeve 84 to its full or complete lockup position shown in FIG. 8 wherein the second spring 198 is fully compressed. Upon the sleeve being shifted to the left, for return to its neutral position of FIG. 2, the second spring 198 expands and returns the fork assembly to its FIG. 2 neutral position.

While a specific embodiment of the invention has been shown and described in detail to illustrate the application of the principles of the invention, it will be understood that the invention may be embodied in other forms without departing from such principles.

I claim;

1. In a gear synchronizer assembly comprising a gear member rotatable on a transmission shaft, said gear member including external spline teeth and having a conical portion formed thereon with an external conical surface, a blocker ring mounted on said gear member external conical surface having an internal conical surface for frictional engagement therewith, a hub member fixedly mounted on said shaft for rotation therewith and having a cylindrical hub portion encircling said blocker ring, said hub member formed with external spline teeth, a clutch sleeve encircling said hub portion and having internal spline teeth in continual engagement with said hub portion external spline teeth, said clutch sleeve being axially movable by a shifting arrangement toward and away from said gear member such that said clutch sleeve internal spline teeth are adapted to engage with the external spline teeth of said gear member, and resilient loading means for moving said blocker ring toward said gear member during the axial shifting operation of said clutch sleeve toward said gear member to effect frictional engagement of said blocker ring internal conical surface with said gear member external conical surface, said shifting arrangement comprising a shaft rail disposed in spaced parallel relation with said shaft having forward and rearward ends, means for supporting said rail adjacent its forward and rearward ends for permitting axial reciprocal movement of said rail during selected modes of operation of said synchronizer assembly, said shifting arrangement further comprising a shift fork assembly mounted on said rail, said shift fork assembly having a shift fork member adapted to co-act with said clutch sleeve for slidable reciprocal travel along said shaft, the improvement wherein:

said shift fork assembly including an arm portion having forward and rearward tube portions fixed thereto and extending longitudinally therefrom, said forward tube portion defining a forward end contact face and said rearward tube portion defining a rearward end contact face, said tube portions encircling said rail and fixed thereto, a U-shaped bracket having a base portion formed with a forward flange and a rearward flange arranged substantially perpendicular to the principal axis of said rail, said flanges having aligned apertures such that said forward flange sides on said rail adjacent said forward end contact face and said rearward flange slides on said rail adjacent said rearward end contact face, a first spring means positioned intermediate said forward flange and said shift fork assembly operative to bias said forward flange forwardly in a predetermined axial spaced relation from said forward end contact face, a second spring means positioned intermediate said rearward flange and said shift rail rearward end support, means for axially shifting said U-shaped bracket rearwardly thereby causing said first and second spring means to be compressed until said forward flange engages said forward end contact face, whereby upon said clutch sleeve moving from its neutral position to a position wherein said blocker ring and gear member conical surfaces are frictionally loaded by said resilient loading means developing a cone torque therebetween, whereby said blocker ring is rotated in one direction to an indexed position causing each said sleeve internal spline tooth positioned with its rearward chamfered edge engaging the chamfered edge of an opposed block ring external spline tooth thereby developing an index torque, and wherein upon the index torque developed in said indexed position exceeding the cone torque developed by said conical surfaces said blocker ring is rotated in the opposite direction allowing said sleeve internal splines to pass into engagement with said gear member external splines, such that said first spring means snaps said shift fork assembly toward said shift rail rearward end resulting in said rearward end contact face contacting said bracket rearward flange allowing said sleeve internal spline teeth to readily pass through said blocker ring external spline teeth and into initial locked engagement with said gear member spline teeth, whereby said sleeve being operatively effective to complete its rearward travel into its full locked-up position by said shifting means.

2. In a gear synchronizer assembly comprising a gear member rotatable on a transmission shaft, said gear member including external spline teeth and having a conical portion formed thereon with an external conical surface, a blocker ring mounted on said gear member external conical surface having an internal conical surface for frictional engagement therewith, a hub member fixed mounted on said shaft for rotation therewith and having a cylindrical hub portion encircling said blocker ring, said hub member formed with external spline teeth, a clutch sleeve encircling said hub portion and having internal spline teeth in continual engagement with said hub portion external spline teeth, said clutch sleeve being axially movable by a shifting arrangement toward and away from said gear member such that said clutch sleeve internal spline teeth are adapted to engage with said external spline teeth of said gear member, and resilient loading means for moving said blocker ring toward said gear member during the axial shifting operation of said clutch sleeve toward said gear member to effect frictional engagement of said blocker ring internal conical surface with said gear member external conical surface, said shifting arrangement comprising a shaft rail disposed in spaced parallel relation with said shaft having forward and rearward ends, means for supporting said rail adjacent its forward and rearward ends for permitting axial reciprocal movement of said rail during selected modes of operation of said synchronizer assembly, said shifting arrangement further comprising a shift fork assembly mounted on said rail, said shift fork assembly having a shift fork member adapted to coact with said clutch sleeve for slidable reciprocal travel along said shaft, the improvement wherein:

said shift fork assembly including an arm portion having forward and rearward tube portions fixed thereto and extending longitudinally therefrom, said shift fork member having an apertured arm portion, a longitudinal tube having forward and rearward end faced, said tube extending through said arm portion aperture and fixed therein defining forward and aft tube portions, said tube encircling said rail and fixed thereto, a U-shaped bracket having a base portion formed with a forward flange and a rearward flange arranged substantially perpendicular to the principal axis of said rail, said flanges having aligned apertures such that said forward flange slides on said rail adjacent said forward end contact face and said rearward flange slides on said rail adjacent said rearward end contact face, a first compression coil spring concentrically disposed about said forward tube portion intermediate said forward flange and said shift fork assembly operative to bias said forward flange forwardly in a predetermined axial spaced relation from said forward end contact face, a second compression coil spring concentrically disposed about said rearward tube portion intermediate said rearward flange said shift rail rearward end support, means for axially shifting said U-shaped bracket rearwardly thereby causing said fist and second spring means to be compressed until said forward flange engages said forward end contact face, whereby upon said clutch sleeve moving from its neutral position to a position wherein said blocker ring and gear member conical surfaces are frictionally loaded by said resilient loading means developing a cone torque therebetween, whereby said blocker ring is rotated in one direction to an indexed position causing each said sleeve internal spline tooth positioned with its rearward chamfered edge engaging the chamfered edge of an opposed blocker ring external spline tooth thereby developing an index torque, and wherein upon the index torque developed in said indexed position exceeding the cone torque developed by said conical surfaces, said blocker ring is rotated in the opposite direction allowing said sleeve internal splines to pass into engagement with said gear member external splines, such that said first spring means snaps said shift fork assembly toward said shift rail rearward end resulting in said rearward end contact face contacting said bracket rearward flange allowing said sleeve internal spline teeth to readily pass through said blocker ring external spline teeth and into initial locked engagement with said gear member spline teeth, whereby said sleeve being operatively effective to complete its rearward travel into its full locked-up position by said shifting means.

3. In a transfer case apparatus adapted for a motor vehicle having front and rear ground engaging wheels, said apparatus including an input shaft adapted for connection to an engine of the motor vehicle, a first output shaft adapted for driving connection to the rear wheels and a second output shaft adapted for driving connection to the front wheels, gear reduction means positioned between said input shaft and said first output shaft, a synchronizer clutch assembly comprising a hub member splined to said first output shaft in axially spaced relation from a chain carrier journalled on said first output shaft, said clutch assembly having a blocker ring with an internal conical surface disposed for controlled abutment with an external conical surface on said chain carrier, said hub member including a cylindrical hub portion encircling said blocker ring formed with external spline teeth, a clutch shifting sleeve encircling said hub portion provided with internal spline teeth shiftably engaging external spline teeth on said hub portion, a plurality of circumferentially spaced strut grooves formed in said hub portion each receiving a strut therein, spring means normally biasing each said strut radially outward so as to press each said strut of said sleeve, a fork member adapted to shift said sleeve from a first disengaged two-wheel drive mode, wherein input shaft torque is transmitted only to said first output shaft, to a second engaged four-wheel drive mode wherein torque is transmitted both to said first and second output shaft, and an improved shift fork assembly for engaging said synchronizer clutch during said two wheel to four wheel shifting mode comprising; a shift rail disposed in spaced parallel relation with said input shaft having forward and rearward ends, means for preventing axial movement of said rail during selected modes of gear box operation, said shift fork assembly mounted on said rail, said shift fork assembly including a fork having projecting portions adapted to co-act with said synchronizer clutch sleeve for slidable reciprocal coaxial travel along said first output shaft from said two wheel drive mode to said four wheel drive mode, the improvement wherein:

said fork having an apertured arm portion, a longitudinal tube having forward and rearward end faces, said tube extending through said fork arm portion aperture and fixed therein defining forward and aft tube portions, said tube encircling said rail and fixed thereto, a U-shaped bracket having a base portion and a forward flange and a rearward flange arranged substantially perpendicular to the principal axis of said rail, said flanges having aligned apertures such that said forward flange slides on said rail adjacent the forward end face and said rearward flange slides on said rail adjacent said tube rearward end face, a first compression coil spring concentrically disposed about said forward tube portion intermediate said forward flange and said fork arm portion so as to bias said forward flange forwardly in predetermined axial spaced relation from said forward end face, a second coil spring concentrically disposed about said shift rail intermediate said rearward flange and said shift rail rearward end, means for axially shifting said U-shaped bracket rearwardly thereby causing said first and second coil springs to be compressed until said forward flange engages said tube forward end such that said blocker ring internal conical surface and said chain carrier exterior conical surface are frictionally loaded by said struts developing a cone torque therebetween, whereby said blocker ring is rotated in one direction to an indexed position causing each said sleeve internal spline tooth positioned with its rearward chamfered edge engaging the chamfered edge of an opposed blocker ring external spline tooth thereby developing an index torque therebetween, and wherein upon the index torque developed in said indexed position exceeding the cone torque developed by said conical surfaces said blocker ring is rotated in the opposite direction allowing said sleeve internal splines to passs into engagement with said gear member external splines, such that said first spring snaps said shift fork assembly toward said shift rail rearward end resulting in said tube rearward end face contacting said bracket rearward flange allowing said sleeve internal spline teeth to readily pass through said blocker ring external spline teeth and into initial locked engagement with said chain carrier spline teeth, whereby said sleeve being operatively effective to complete its rearward travel into its full locked-up position by said shifting means placing said transfer case apparatus into its engaged four-wheel drive mode.

* * * * *